US00RE37202E

(19) United States
(12) Reissued Patent
Semeia

(10) Patent Number: US RE37,202 E
(45) Date of Reissued Patent: Jun. 5, 2001

(54) POPPET SEAT FOR AIR REGULATING DEVICES

(75) Inventor: Roberto Semeia, San Salvatore di Cogorno (IT)

(73) Assignee: Johnson Outdoors Inc., Sturtevant, WI (US)

(21) Appl. No.: 09/112,187

(22) Filed: Jul. 9, 1998

Related U.S. Patent Documents

Reissue of:
(64) Patent No.: 5,533,543
Issued: Jul. 9, 1996
Appl. No.: 08/374,963
Filed: Jan. 19, 1995

(51) Int. Cl.[7] ..... F16L 55/18
(52) U.S. Cl. ..... 137/15; 251/359
(58) Field of Search ..... 251/359, 360, 251/362; 137/375, 15

(56) References Cited

U.S. PATENT DOCUMENTS 3,407,838 * 10/1968 Boteler ..... 137/375
3,791,767 * 2/1974 Shill ..... 417/389
3,825,030 * 7/1974 Kalsi ..... 137/375

FOREIGN PATENT DOCUMENTS

111910 * 6/1984 (EP) ..... 251/359
1217697 * 12/1970 (GB) ..... 251/360

* cited by examiner

*Primary Examiner*—A. Michael Chambers
(74) *Attorney, Agent, or Firm*—Foley & Lardner

(57) ABSTRACT

A poppet seat for air regulating devices, such as underwater diving equipment, includes a metal or plastic substrate around and through which synthetic or rubber seat material is molded. In its preferred form, this seat material surrounds the sides of the substrate and fills holes therein as well as an annular v-groove formed in the periphery of the substrate to further enhance the mechanical bond between the substrate and seat material.

23 Claims, 1 Drawing Sheet

POPPET SEAT FOR AIR REGULATING DEVICES

Matter enclosed in heavy brackets [ ] appears in the original patent but forms no part of this reissue specification; matter printed in italics indicates the additions made by reissue.

CROSS-REFERENCE TO RELATED APPLICATIONS

If Any: None.

BACKGROUND OF THE INVENTION

1. Field of the Invention

The present invention relates generally to the art of poppet seats and more particularly to poppet seats useful in air regulating devices. In its most preferred embodiment, the present invention relates to an improved poppet seat in which synthetic or natural rubber seat material is molded around and through an annular carrier. The invention also relates to a method for making a poppet seat of this type.

2. Description of the Prior Art

In the field of air regulating devices, such as those used in underwater diving equipment (more commonly known as scuba equipment) breathable air is provided to the diver from a pressurized air source, e.g. a compressed air cylinder, a surface supply hose, etc.

In most equipment a primary regulator is employed to reduce the air pressure available to the diver from the pressurized source, such as a pressurized air tank, and a demand regulator functions to supply air in accordance with the diver's breathing pattern. In current demand regulators, poppet seats have been commonly manufactured by providing a carrier base made out of plastic or metal material and having a groove about its center. Pliable seat material has been added to the groove and has been held in place by friction and/or by adhesive bonding. In one prior art device, such seats were exposed to pressures in the range of 120–150 pounds/in$^2$ and made spring loaded contact with a coned orifice member to provide a complete seat of the pressure. Such poppet seats are subjected to widely varying environmental conditions and cyclic use since each time a breath is taken, a spring is relieved thereby allowing movement of the coned orifice member toward and away from the seal and permitting the bypass of breathable air to the scuba diver.

Such poppets have proved to be highly effective over extended periods of time, but several design aspects of the current system make it possible for small leakage to occur. For example, the coned orifice can become damaged or the seating surface itself may be contaminated or deformed. These occurrences are especially likely in situations where the regulator is not maintained properly, e.g. if it is not reused as recommended by most manufacturers. Leakage could also occur if the seat material becomes delaminated from the substrate carrier base, as could happen for example if the adhesive or frictional forces became weakened. If any of these occurrences would take place while the diver was below water, normal emergency procedures, such as the use of a back-up regulator, would be employed to allow a divers safe return to the surface. Repair of this regulator would then be required.

While the first two problems mentioned above may be readily cured by proper maintenance, the later problem is less easy to observe, as it can occur over time. An improvement in design would be desirable to make sure the air supply is not bypassed due to inappropriate separation of the seat material from the carrier component.

SUMMARY OF THE INVENTION

The present invention features a seat for use in air regulating devices, such as second stage regulators in diving equipment, in which pliable material is applied through holes in the carrier to provide a mechanical securing of the seat material to its substrate. In accordance with another feature, the present invention employs such mechanical attachment in combination with chemical bonding to increase, even further, the adherence of the seat material to its substrate.

More specifically, the present invention features a technique for encapsulating a substrate base and anchoring seat material therethrough by means of through-hole molding using holes which are geometrically reversed when compared to the direction from which delamination forces would be most likely to occur.

Yet another feature of the present invention is to provide an encapsulated substrate, wherein the encapsulating seat material forms a seating member that also flows into a v-groove surrounding the periphery of the substrate to enhance attachment thereto. In still another modification of the later feature, the v-groove intersects a plurality of through holes to further enhance the security of the seat and substrate.

The invention also features a method for manufacturing a valve seat of the type including an annular base and an elastomeric seating material affixed to the base. The method includes the steps of forming an annular groove in the base and securing the seating material to the base such that the seating material contacts at least a portion of the groove generally in opposing relation with respect to an upper surface of the base.

How these and other features of the present invention are accomplished will be described in the following detailed description of the preferred embodiment, taken in conjunction with the drawings. Generally, however, they are accomplished by using a synthetic or natural rubber seat material and molding it with a substrate which is preferably of annular form. In the most preferred embodiment, the substrate includes a v-groove around its periphery and a plurality of holes so that the molding material passes through the holes and around the v-groove, most preferably encapsulating the entire periphery of the carrier. In the most preferred embodiment, the holes of the substrate are geometrically reversed to increase the seats ability to withstand any delamination forces. Other ways in which the objects of the invention are accomplished will become apparent from the following detailed description after it is read and understood by those knowledgeable in the art. Such other ways are also deemed to fall within the scope of the present invention.

DETAILED DESCRIPTION OF THE DRAWINGS

In the various FIGURES like reference numerals are used to indicated like components.

DETAILED DESCRIPTION OF THE PREFERRED EMBODIMENT

Figure 1:
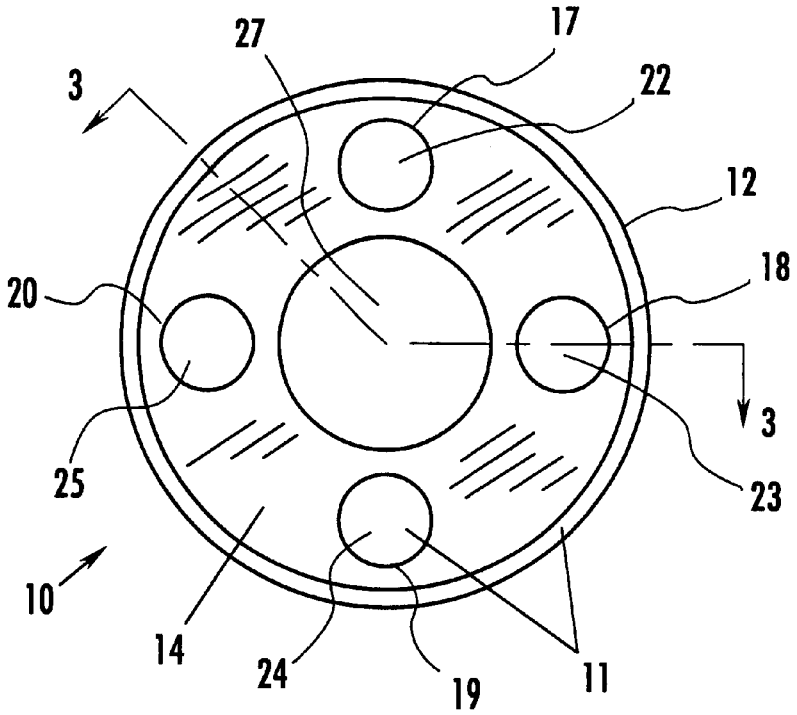
FIG. 1 is a bottom plan view of the poppet seat forming the most preferred embodiment of the present invention.

Before proceeding to the detailed description of the preferred embodiment, several general comments should be made about the applicability and the scope of the present invention. First, with regard to the materials to be employed, the carrier or substrate material is most commonly prepared from a metal such as brass or stainless steel, although plastics could also be employed. As to the seat material itself, synthetic or natural rubber materials are preferred, the most typical being silicone rubber which has been used heretofore in preparing such seats for air control devices. A preferred seat material in the present invention is silicon rubber, such as Silastic LCS 755 silicon rubber, manufactured by Dow Corning.

As to the use of the seat described in this section of the specification, it could be employed in a number of devices other than that mentioned in the background section hereof. For example, the article shown in the drawings could be used in a wide variety of air or other fluid control devices wherein it is desired to have structural rigidity and mechanical adherence of a pliable seat material to a substrate. This should be kept in mind as the balance of the specification is read, even though demand regulator poppet seats are mentioned and shown. One familiar with air control devices could readily adapt the teachings of the present invention to other seat design, taking into account such factors as diameter, thickness, applicable durometer, environmental conditions and the like. Furthermore, one could refer to the instruction manuals, engineering bulletins and maintenance guides for such regulators as the Scubapro Models D400, D350, D300 and AIRI to learn more about such poppet seats and their interaction with other control device components. Copies of Scubapro Engineering Bulletin Nos. 237 and 238 are submitted with this specification for that purpose.

Proceeding next to a brief description of the prior art, prior art molded seats have been made using annular brass inserts or substrates, much like a washer, having a central through opening and an annular groove in one surface thereof. Rubber was added by a molding process to the groove to provide a seat for the coned orifice mentioned above.

In the present invention, molded rubber in a groove is replaced by rubber which is molded with the insert so that it, in the most preferred embodiment, surrounds the sides and fills various through holes to be described in detail hereafter. A molded seat 10 according to the present invention is show in bottom view in FIG. 1. The molding material 11 encases the periphery 12 of a substrate 14, and the rubber passes through holes 17–20 as shown at 22–25. The central opening of the substrate is shown at 27.

Figure 2:
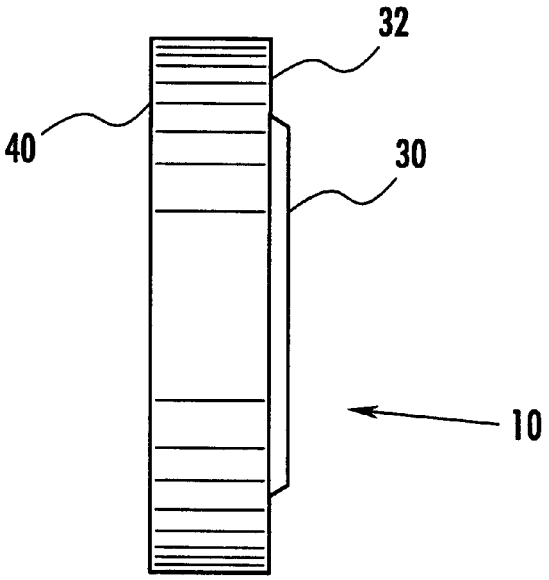
FIG. 2 is a side elevation showing the seat material lip extending from the upper surface of the seat.

A side view of the molded seat is shown in FIG. 2 when a lip 30 is shown extending from the upper surface 32. The configuration of the lip will become more apparent as the explanation continues with a description of FIG. 3.

Figure 3:
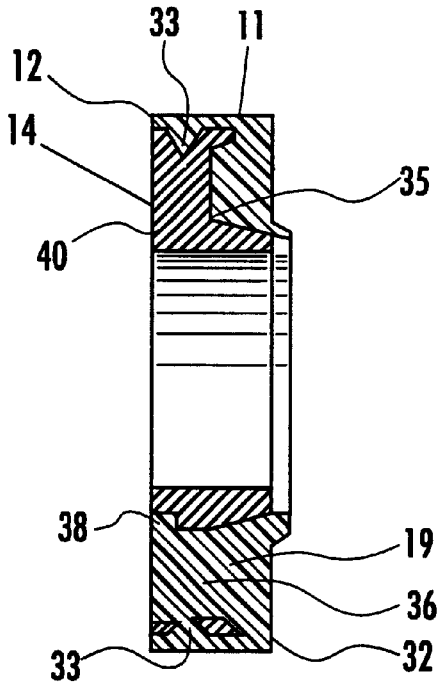
FIG. 3 is a cross section taken along the line 3—3 of FIG. 1 showing the location of the molding material and the reversed drilled holes and v-groove around the perimeter of the substrate.

FIG. 3 is a sectional view showing that the substrate in the most preferred embodiment, includes a v-groove 33 surrounding its periphery, while a recess 35 extends around its upper surface. FIG. 3 also illustrates that through holes 17–20 are provided, as shown particularly at the bottom of this FIGURE. For hole 19, reverse drilling has occurred so that the hole has a smallest diameter 36 near its upper surface 32 and a larger diameter portion 38 near the bottom surface.

From this description and from FIG. 3 it is evident that the holes 17–20 intersect the bottom of the v-grooves 33 so that rubber may flow from the holes 17–20 into the v-groove 33 or vice versa. Note that while the rubber does not extend beyond the bottom surface 40 of the brass substrate 14, it does flow into portion 38 of the holes 17–20 to resist any delamination forces which may exist.

In addition to the mechanical forces used to hold the molded seat material to the substrate, chemical bonding aids may also be employed. In the most preferred embodiment of the invention, chemical bonding is provided by using a bonding agent, and preferably methanol based agents, such as Chemlock Adhesive No. Y1540, available from Lord Chemical Products.

While the preferred embodiment shows two different techniques for increasing the mechanical bonding of the seat material to the insert, each of the techniques, the through holes 17–20 and the v-groove 33, could be employed separately to enhance performance when compared to the prior art devices described above. Optimum results would be obtained by using both, together with a chemical bonding agent.

While the present invention has been described and illustrated in connection with a single preferred embodiment, it is not to be limited thereby but is to be limited solely by the claims which follow.

What is claimed is:

1. A method for manufacturing a valve seat of the type including an annular base having an outer annular periphery, a central aperture extending from an upper surface to a lower surface and an elastomeric seating material affixed to the base, the method comprising the steps of:

forming at least one aperture in the base extending from the upper surface adjacent to the central aperture;

forming an annular groove in the base, the annular groove extending into communication with the at least one aperture, at least a portion of the groove being in generally opposing relation with respect to the upper surface; and securing the seating material to the base by molding the seating material onto the base such that the seating material at least partially contacts the upper surface and the outer annular periphery, flows through the at least one aperture, and contacts the portion of the groove.

2. The method of claim 1, wherein the annular groove has a generally V-shaped cross section and is formed in the periphery of the base.

3. The method of claim 1, wherein the securing step includes chemically bonding the seating material to the base.

4. A valve seat comprising:

a base having an annular body, an upper surface, an outer periphery, a central opening and at least one retaining surface spaced from the upper surface and at least partially opposed to the upper surface, an aperture extending from the upper surface through the body adjacent to the central opening to the outer periphery; and a seat material affixed to the base, extending from the upper surface through the aperture and contacting the retaining surface, the seat material at least partially enveloping the upper surface and the outer periphery, whereby the seat material bears against the retaining surface to resist forces tending to remove the seat material from the base.

5. The seat of claim 4, wherein the base is an annular metallic ring and the seat material is a moldable elastomeric material.

6. The seat of claim 4, wherein the base is made of a plastic material.

7. The seat of claim 4, wherein the base includes an annular groove, at least a portion of the annular groove being oriented in opposing relation with respect to the upper surface to define the retaining surface.

8. The seat of claim 7, wherein the annular groove has a V-shaped cross section and is formed in the periphery of the base.

9. The seat of claim 4, wherein the seating material is chemically bonded to the base.

10. A seat assembly for use in an air regulating device, the seat assembly comprising:

an annular substrate having an upper surface, an outer periphery, a central aperture, a plurality of apertures extending from the upper surface and through the substrate adjacent to the central aperture, and a retaining surface at least partially opposed to the upper surface, the retaining surface being at least partially formed by an annular groove formed in the outer periphery of the substrate, the groove communicating with the apertures; and a seating member extending around at least a portion of the upper surface, at least a portion of the outer periphery and at least a portion of the retaining surface, the seating member also extending into the apertures and thereby into the annular groove, thereby at least partially encapsulating the substrate and bearing against at least a portion of the retaining surface to anchor the seating member on the base.

11. The seat assembly of claim 10, wherein the substrate further includes a lower surface generally opposed to the upper surface and the plurality of apertures surround the central aperture and extend from the upper surface to the lower surface.

12. The seat assembly of claim 11, wherein the plurality of apertures are geometrically reversed with respect to the upper surface to define a portion of the retaining surface.

*13. A valve seat comprising:*

*a base having an annular body with an outer periphery, a retaining surface opposite an upper surface of the outer periphery, and an outer circumferential perimeter extending between the upper surface and the retaining surface, a central opening extending from the upper surface, and an aperture extending from the upper surface through the body adjacent to the central opening to the outer periphery and in communication with the retaining surface; and*

*a seat material affixed to the base, the seat material continuously extending along the upper surface through the aperture along the retaining surface and along the perimeter, the seat material at least partially enveloping the upper surface, the retaining surface and the outer circumferential perimeter, whereby the seat material resists forces tending to remove the seat material from the base.*

*14. The seat of claim 13, wherein the body includes a bottom surface opposite the upper surface and wherein the retaining surface extends intermediate the upper surface and the bottom surface.*

*15. The valve seat of claim 13 wherein the central opening provides an air passage through the base.*

*16. A valve seat comprising:*

*a base having an annular body with an outer periphery, a lower surface opposite an upper surface of the outer periphery, an outer circumferential perimeter extending between the upper surface and the lower surface, a central opening extending from the upper surface, and an aperture extending from the upper surface through the body adjacent to the central opening to the lower surface to the outer periphery; and*

*a seat material affixed to the base, the seat material continuously extending along the upper surface through the aperture, along the lower surface and along the perimeter, the seat material at least partially enveloping the upper surface, the lower surface and the outer perimeter, whereby the seat material resists forces tending to remove the seat material from the base.*

*17. The seat of claim 16, wherein the body includes a bottom surface opposite the upper surface and wherein the lower surface extends intermediate the upper surface and the bottom surface.*

*18. The valve seat of claim 16 wherein the central opening provides an air passage to the base.*

*19. A valve seat comprising:*

*a base having an annular body with a central opening extending from an upper side of the body and an outer side, the body including at least one aperture extending therethrough from the upper side adjacent to the central opening and a wall between the outer side and the aperture; and*

*a seat material encapsulating the wall on at least four sides, whereby the seat material resists forces tending to remove the seat material from the base.*

*20. The valve seat of claim 19 wherein the central opening provides an air passage to the base.*

*21. A valve seat comprising:*

*a base having an annular body with an upper surface, an outer circumferential side and a central opening extending from the upper surface along a first axis, the body including an aperture extending along a second axis from the upper surface through the body adjacent to the central opening, an outer wall portion bounded by the aperture, the outer side, a first surface non-parallel to the aperture and the outer side, and a second surface spaced from the first surface and oblique to the aperture and the outer side; and*

*a seating material continuously extending into the aperture, along the outer side and along the first and second surfaces to encapsulate the wall portion, whereby the seat material resists forces tending to remove the seat material from the base.*

*22. The valve seat of claim 21 wherein the central opening provides an air passage to the base.*

*23. The valve seat of claim 4 wherein the central opening provides an air passage through the base.*

* * * * *